Sept. 16, 1930.  W. D. DOOLEY  1,776,217
RECTIFYING DEVICE AND METHOD OF MAKING THE SAME
Filed Sept. 12, 1928
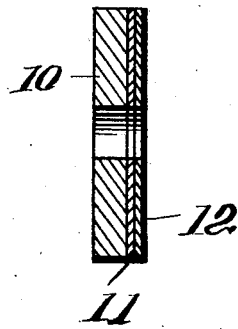
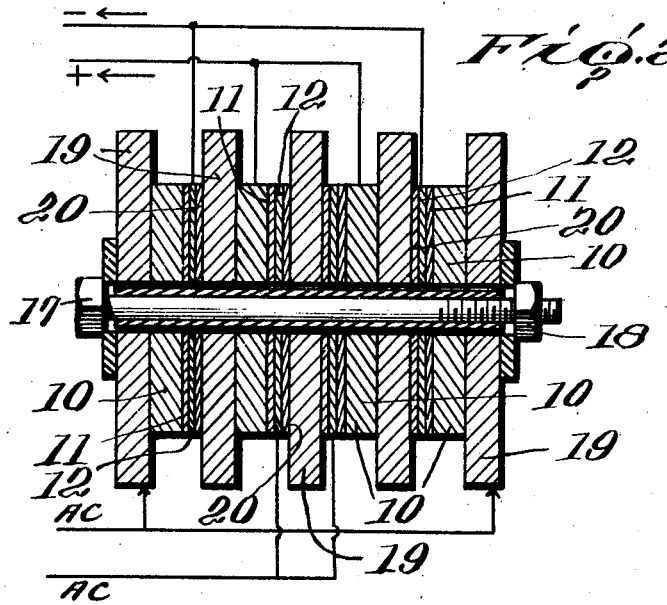
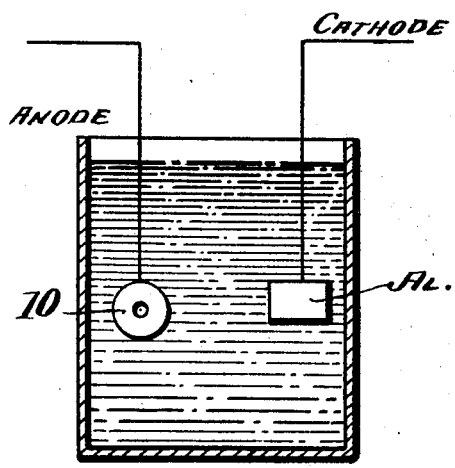
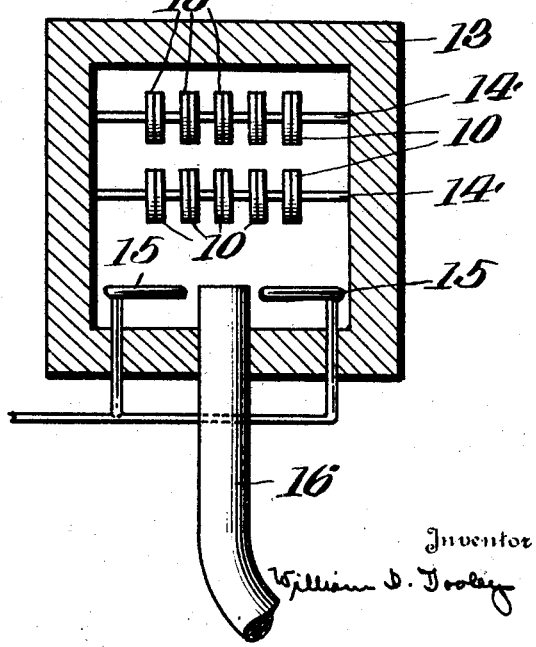
Inventor
William D. Dooley
By
Attorneys Patented Sept. 16, 1930

1,776,217

UNITED STATES PATENT OFFICE

WILLIAM D. DOOLEY, OF WHEELING, WEST VIRGINIA

RECTIFYING DEVICE AND METHOD OF MAKING THE SAME

Application filed September 12, 1928. Serial No. 305,577.

This invention relates to improvements in a rectifying device and method of producing the same, being directed more particularly to that type of rectifier known as the dry surface type and which is for the purpose of converting alternating electric currents into unidirectional currents.

The present invention has been conceived and perfected for the purpose of overcoming certain disadvantages and weaknesses present in the rectifiers now on the market, and the advantages, improvements and novel features of the invention will be hereinafter more specifically pointed out.

One object of the invention is the provision of a rectifier of the dry surface contact type which does not build up an excessive heat in itself even when used to rectify currents of high voltage.

Another object of the invention is the method or process of preparing the plates which go into the make-up of the rectifier, which plates have upon them two distinct films.

A further object of the invention is a novel process of placing an electrolytic film on a copper plate for use in a rectifier of the type hereinafter described.

Another and further object of the invention is the provision of a dry surface contact type of rectifier which will be highly effective in its operation, simple in construction and economical in its manufacture, which advantages are due to the particular novel construction of rectifier and the method of producing the same.

In the accompanying drawings:

Figure 1 illustrates in cross-section a single rectifier plate or cell.

Fig. 2 illustrates a plurality of the rectifier cells coupled together for installation when it is desirable to obtain full wave rectification and convert high voltage alternating current into uni-directional current.

Fig. 3 is a diagrammatic showing of an asymmetric cell for forming the asymmetric film on the copper plates.

Fig. 4 is a diagrammatic showing of an electric furnace and apparatus used in producing the rectifier cells.

The metallic plate which comprises my improved rectifier is composed of what is commonly known as one of the non-film forming metals, such as copper, brass, iron and the like. In the rectifier illustrated in the accompanying drawings, the metallic plate is of copper which is the preferable metal to use.

Heretofore, to the best of my knowledge, it has not been found possible to form upon the surface of a copper plate, or other so-called non-film forming metal, an asymmetric film. By utilizing a novel and unique method, I have discovered a process which I believe, after numerous tests and investigations, forms upon the surface of a copper plate or washer an electrolytic film such as that commonly formed on the group or film forming metals, such as aluminum, bismuth, tantalum, magnesium, etc. when these metals are placed in the proper electrolyte and an alternating or direct current passed through them.

Insofar as I am aware, the metallic plates going into the make-up of metallic rectifiers now known, are prepared either by forming an oxide of the metal on the surface of the plate or washer, by the process of heating said metal in a furnace to a certain degree of heat and thereupon admitting into the furnace $O_2$ thereby forming an oxide directly on the surface of the metal itself, or a sulphide of the metal itself to form thereon cuprous sulphide.

A different process from those now known is practiced by me in preparing the copper plates or washers for use in my improved rectifier. In carrying out my process and using for an example a copper plate or washer having a surface area of 8 sq. centimeters, this washer is used as an anode in an asymmetric cell, the cathode being aluminum as clearly illustrated in Fig. 3 of the drawings. The solution or electrolyte in the cell consists of 1 oz. of aluminum sulphite, ½ oz. ammonium phosphate, 20 gr. ammonium oxalite, 2 oz. sodium bicarbonite to 2 gal. of distilled water.

As it is desirable to form a film on only one surface of the copper plates or washers, two plates are placed back to back and securely clamped together by means of a screw or other well-known compressing device. The washers are then immersed in the electrolyte solution of the cell as the anode of the cell and current passed through them. It has been found that the density of the film formed on the washer is governed solely by the amount of potential applied and the amount of time the washer or plates are left immersed in the electrolyte or film forming solution.

I have further discovered that the aluminum making up the cathode of the cell should be of a size one-half that of the anode or copper plates or washers. As an example, assuming that the copper plates or washers have a square surface area of 8 centimeters, the aluminum electrode used as a cathode should have a surface area, of 4 centimeters.

Attention is directed at this time to the fact that experimentation has proven that these copper plates or washers may be prepared to operate as rectifiers at any direct voltage not exceeding 500 volts. It is thought that these plates can be made to stand a more extensive voltage, but up to the present time I have not made plates which operate to my satisfaction beyond 500 volts.

Although a single plate, such as illustrated in Fig. 1 of the drawings constitutes in itself a rectifier, it is necessary to mount a plurality of these plates together, such as illustrated in Fig. 2 of the drawings, to constitute a full wave rectifier. It is therefore desirable for that reason and for economy in manufacture to prepare a series of copper plates or washers. In preparing these copper plates to be used on a voltage output of 7½ volts D. C. would, therefore, require a potential of starting current in the fixing bath of 10½ or 11 volts and the current flow from the cathode to the anode would be from 1 ampere to 20 amperes depending upon the number of washers or plates immersed in the asymmetric cell. The ratio stated has been determined by extensive experiments and has the effect that the starting current in the fixing bath is 1⅓ to 1 in respect to the voltage output of the rectifier in which the plates are to be used. This ratio holds good in respect to a rectifier handling an output up to 100 volts, whereas in respect to plates to be used in the rectifier capable of handling an output in excess of 100 volts the ratio of starting current in the fixing bath is 2 to 1 in respect to the voltage output of the rectifier in which the plates are to be used.

In the treatment of the plates in the asymmetric cell it has been found that the current flow in amperes would gradually decrease as the film is formed on the copper plates or washers and that the temperature of the fixing bath or electrolyte solution will gradually rise to the boiling point, as the current flow decreases this temperature will drop back to around 180 to 190° F.

By reference to the drawings, it will be seen that the copper plates or washers are designated by the numeral 10. The first step in the treatment of the washers just described, forms upon one side of them a film which, in the drawings, has been designated by the numeral 11. To complete these copper plates a second film, designated in the drawings by the numeral 12, is deposited upon the first film 11.

To deposit or form the second film upon the washers or plates, they are placed in a thermostatically controlled furnace 13, such as illustrated in Fig. 4 of the drawings. This furnace is provided with suitable racks 14 and the washers 10 are placed back to back upon these racks. The furnace is heated by a suitable conventional electric resistance heater 15, and the washers are heated at 300° F. for 45 minutes after which the heat is increased from 850 to 900° centigrade. This heating insures a proper drying or setting or hardening of the electrolytic film.

A cuprous sulphide gas is admitted to the interior of the furnace from a suitable source through a pipe 16 and this gas, due to the action of the heat upon the copper plates or washers forms an oxide of the metal which is commonly known as cuprous oxide upon the asymmetric film 11, which has been hardened upon the plates.

The plates are heated at the above given temperatures in the atmosphere of the cuprous sulphate form 30 minutes to one hour to complete this step or process. When this step of the process is completed it will be found that there is a very thin layer of cupric oxide on the surface of the cuprous oxide. It is desirable to remove this cupric oxide which may be done by any suitable method such as a sand wheel or sand blast, or by dipping in nitric acid. This is done for the purpose of leaving a smooth and uniform oxide film so that when the plates are assembled in a rectifier a good contact will be had to prevent excessive heat generation.

In order to assure perfect operation of the plates in a rectifier, the asymmetric or electrochemical film formed on the copper plates or washers must be perfectly formed and homogeneous so that the second and outside film of cuprous oxide will adhere to the copper plates or washers. The films or compound which are formed on the copper plates must have substantially the same coefficient of expansion as the metal on which it is formed, or in any case must adhere sufficiently well and be of such mechanical strength as to prevent it from breaking loose from the plates upon cooling.

The essential characteristics of these two films 11 and 12 is that they must conduct electricity without undergoing decomposition or chemical change, and that is to say, the rectifying films must remain permanent and unchangeable. To this end and to attain these essential results the films must be a metallic conductor as readily distinguishable from an electrolytic conductor in which the compound would decompose when a flow of electric current was passed through it.

These rectifying films superimposed upon the surface of these copper plates or washers conduct the current electroionically and not ionically and must remain an electronomic conductor under all reasonable operating temperatures.

A rectifier made in accordance with the process hereinafter described, I have found has no trace of electromotive force due to polarization and no other signs of decomposition. Polarization would be readily discernible if the rectifier were of an electrolytic compound or conductor. These rectifiers when constructed of a metal prepared by the process which I have described offer a very low resistance of current flowing in one direction and a very high resistance of current flowing in the other direction. The ratio of high resistance to the low resistance is commonly figured as the rectifying ratio.

The resistance in the low and high resistance directions and the rectifying ratio of this device may vary in response to several factors. To illustrate this point, I have found that when these rectifying plates or washers are assembled in groups and the surfaces of them are brought together under pressure that the greater pressure applied thereto, each to certain limits, brings about a remarkable increase in rectification.

On one specimen which was tested at the Armour Institute in Illinois, it was found that a change of pressure of 15 pounds per inch to a pressure of 130 per square inch caused the rectification ratio to differentiate from approximately 30 to 145. This increase of ratio, I believe, is due to the fact that the low resistance decreases when the pressure is increased by a greater percentage than does the high resistance. To illustrate this point, I give an example; reading from the high resistance side of my rectifier the high resistance decreased from 800 ohms to 350 ohms as the pressure was increased from 15 to 135 pounds per square inch; this change of resistance being about 42% whereas with the same increase of pressure the low resistance decreased from 28 ohms to 3.40 ohms— this change being about 80%. In the case of the low resistance, this change is due, in a great way, I believe, by a decrease in the resistance of a contact between the copper oxide and the copper plate or washer itself caused by the increase of pressure. In so far as I have been able up to the present time to determine, the resistance of my device does not change materially with changes in the thickness of the electrolytic or asymmetric film formed, firstly on the copper plate or washer, and secondly, with the thickness of the cuprous oxide film formed on this first film.

It therefore follows that in an assembled rectifier, such as illustrated in Fig. 2 of the drawings, the copper plates should be clamped together under heavy pressure and to accomplish this end the plates 10 are loosely mounted upon the bolt or shaft 17 and tightened upon one another by suitable nuts 18. In this figure of the drawings it will be seen that the bolt or shaft carries a plurality of the rectifying plates which are separated by suitable heat dissipating fins 19, to assure good contact between the plates a thin lead washer 20 is placed between the copper plates. The lead washers can be used when rectifying low voltage and low amperage current, but when rectifying high voltage and high amperage current aluminum washers are preferably substituted for the lead washers due to their peculiar ability to dissipate the heat generated. When aluminum washers are used they are prepared in accordance with the process described in my co-pending application Serial Number 305.576.

In Fig. 2 the input and output currents are clearly indicated and this figure of the drawings illustrates a plurality of rectifying cells or plates coupled together.

The efficiency of my rectifier and the amount of current that can be carried by it depends solely upon the provisions for dissipating the heat which is developed in the rectifier. For an efficient operation the rectifier must be kept reasonably cool and must not be allowed to reach a heat exceeding 60° C. I have noticed that on long tests where my rectifier has been overloaded from 40 to 50% a slight deterioration of the films on the copper plates takes place, probably caused by thermal expansion, and in some instances where lead washers have been used as to contact medium between the plates these lead washers have melted, therefore, aluminum washers, as mentioned above, should be used for high voltage rectification.

I have further found that a rectifier properly built in accordance with my invention and constructed of a plurality of cells and rectifying plates clamped tightly together, that deterioration is so slow as to be hardly perceptible.

A rectifier built in accordance with my invention was kept in constant operation for 1000 hours at 25% overload and was then taken apart and each cell or washer studied minutely. This study showed no deterioration whatsoever, whereas at the end of the 1000 hour test the rectifier showed a gain of 2% in its output.

Another feature of advantage possessed by this rectifier is that it is immediately operative with a full capacity output the instant it is subjected to voltage.

Another great advantage of this rectifier over the numerous rectifiers now on the market is its ability to rectify a large amount of current with a very small plate surface which is due to the super-imposing of the asymmetric or electrochemical film upon the copper plates or washers before forming the cuprous oxide film or coating thereon. The films upon these plates are of such character that they dissipate approximately 60% of the heat generated in the ordinary rectifier.

As this rectifier is of an electroionic nature, it requires no forming as to other rectifiers of the metallic cuprous sulphate and electrolytic types such as those using some of the film forming metals and other oxides.

Devices embodying and utilizing my invention may be used whenever it is desirable to supply uni-directional current of a substantial amount to a current consuming device from an alternating current supply or source. The many uses to which the invention can be put will be obvious to one skilled in the art.

Having thus described my invention attention is called to the fact that due to the first electrolytic film on the copper plates the second film which is an oxide of the metal cannot be formed on the first film by the admission of oxygen alone in the presence of heat, but the oxide film can be successfully deposited on the electrolytic film by introducing a cuprous sulphite gas into the presence of the heat in the furnace.

Repeated tests have proven the above to be true although the exact phenomena which takes place is not known to me.

I claim:

1. In a dry surface-contact rectifier, the combination of an electro-positive electrode composed of copper and an electro-negative electrode composed of an electrolytic film and a separate metallic oxide film superimposed.

2. In a dry surface-contact rectifier, the combination of an electro-positive electrode composed of copper and an electro-negative electrode composed of an electrolytic film and a separate copper oxide film superimposed thereon.

3. In a dry surface-contact rectifier, the combination of an electro-positive electrode composed of copper and an electro-negative electrode composed of an aluminum oxide electrolytic film and a cuprous oxide film.

4. A dry surface-contact rectifier consisting of a copper plate carrying an electrolytic film and a second film composed of metallic oxide superimposed thereon.

5. The process of forming a dry surface-contact rectifying cells which consists in treating a copper plate to form an electrolytic oxide film thereon and superimposing a second oxide film on said first film.

6. The process of forming dry surface-contact rectifying cells which consists in treating a copper plate to form an electrolytic oxide film thereon and superimposing a a second copper oxide film on said first film.

7. The process of producing a dry rectifier cell consisting in forming an electrolytic film on a copper plate, drying said film and exposing said film to the vapors of a metallic substance capable of forming an oxide coating on said film.

8. The process of producing a dry rectifier cell consisting in forming an electrolytic film on a copper plate, drying said film and exposing said film to the vapors of a copper compound capable of forming a cuprous oxide coating on said film.

9. The process of producing a dry rectifier cell consisting of a copper plate having on its surface an electrolytic oxide film upon which is super-imposed a film of oxide of the metal, consisting of making said plate the anode of an asymmetric cell having an electrolyte solution consisting of 1 oz. aluminum sulphate, ½ oz. ammonium phosphate, 20 gr. ammonium oxalite, and 2 oz. sodium bicarbonate to 2 gal. of distilled water, passing a current through said asymmetric cell, hardening said film on said plate by heat, and introducing a cuprous sulphide gas in the presence of heat and forming on said first film an oxide of the metal.

10. The process of producing a dry rectifier cell consisting of a copper plate having on one of its surfaces an electrolytic oxide film upon which is super-imposed a film of cuprous oxide, consisting of clamping a pair of said plates back-to-back and making them the anode in an asymmetric cell having an aluminum cathode of ½ the surface area of the plates and an electrolyte solution consisting of 1 oz. aluminum sulphate, ½ oz. ammonium phosphate, 20 gr. ammonium oxalite, and 2 oz. sodium bicarbonate to 2 gal. of distilled water, passing through said asymmetric cell a voltage 1⅓ times as great as the voltage of the rectifier in which the plates are to be used, hardening said film on said plates in the presence of heat and introducing into the presence of said heat a cuprous sulphide gas and forming on said first film an oxide of the metal.

In testimony whereof I hereunto affix my signature.

WILLIAM D. DOOLEY.